(12) United States Patent
Hughes et al.

(10) Patent No.: US 7,865,264 B2
(45) Date of Patent: Jan. 4, 2011

(54) METHOD AND APPARATUS FOR MATCHING AMOUNT AND TYPE OF PAINT COMPONENT IN A PAINT MANUFACTURING SYSTEM

(75) Inventors: Randall L. Hughes, Glendale, AZ (US); Andrew B. Titus, Mesa, AZ (US); Danny P. Boyle, Dededo, GU (US); Michael Mowen, Gilbert, AZ (US)

(73) Assignee: Microblend Techologies, Inc., Gilbert, AZ (US)

( * ) Notice: Subject to any disclaimer, the term of this patent is extended or adjusted under 35 U.S.C. 154(b) by 106 days.

(21) Appl. No.: 12/348,209

(22) Filed: Jan. 2, 2009

(65) Prior Publication Data
US 2009/0112371 A1  Apr. 30, 2009

Related U.S. Application Data

(63) Continuation-in-part of application No. 11/757,264, filed on Jun. 1, 2007, now Pat. No. 7,698,021.

(51) Int. Cl.
*G06F 17/00* (2006.01)
(52) U.S. Cl. ................ 700/239; 700/240; 700/265; 222/57; 141/1
(58) Field of Classification Search ............. 700/265, 700/266, 282–285, 177, 239; 524/417; 222/144.5, 222/129, 57; 366/132, 140, 141, 152, 177.1; 141/1
See application file for complete search history.

(56) References Cited

U.S. PATENT DOCUMENTS
3,956,206 A  5/1976  Sellars et al.
(Continued)

FOREIGN PATENT DOCUMENTS
CA  935255  10/1973
(Continued)

OTHER PUBLICATIONS

Maty, J. "Have tank, will travel" Paint & Coatings Industry, Mar. 2003 [retrieved Aug. 31, 2010] Retrieved from the Internet <url:http://www.highbeam.com/DocPrint. aspx?DocId=1G1:99018914>, vol. 19, No. 3, pp. 66-68.*

(Continued)

*Primary Examiner*—Albert DeCady
*Assistant Examiner*—Dave Robertson
(74) *Attorney, Agent, or Firm*—Schmeiser, Olsen & Watts LLP

(57) ABSTRACT

A paint manufacturing system, having a paint component storage system with a dispenser positioned below and a computer system which controls a flow of paint components. The paint component storage system having a plurality of paint component cartridges containing paint components; wherein at least two of the paint component cartridges contain the same paint component. A method for adding a component to a container involving: recognizing a volume of component in a container; generating a bar code that corresponds to the amount and type of component to be added; requesting the component; filling a tote with the component; relating the bar code with the filled tote; transporting the tote and related bar code to said container; scanning the tote bar code to verify the amount and type of component in the tote matches the amount and type of component requested; and filling the container when the tote bar code matches.

7 Claims, 13 Drawing Sheets

U.S. PATENT DOCUMENTS

| | | |
|---|---|---|
| 4,046,287 A | 9/1977 | Hoekstra et al. |
| 4,243,430 A | 1/1981 | Sperry et al. |
| D262,628 S | 1/1982 | Meyer |
| 4,373,930 A | 2/1983 | Rothwell |
| 4,403,866 A | 9/1983 | Falcoff et al. |
| 4,436,845 A | 3/1984 | Kitano |
| 4,880,842 A | 11/1989 | Kowalski et al. |
| 5,078,302 A | 1/1992 | Hellenberg |
| 5,129,551 A | 7/1992 | Gott |
| 5,445,195 A | 8/1995 | Kim |
| 5,448,499 A * | 9/1995 | Palmer ............... 700/266 |
| 5,521,234 A | 5/1996 | Brown et al. |
| 5,527,853 A | 6/1996 | Landy et al. |
| 5,541,394 A * | 7/1996 | Kouchi et al. ............ 235/375 |
| 5,643,669 A | 7/1997 | Tsuei |
| 5,672,649 A | 9/1997 | Brock et al. |
| 5,773,752 A | 6/1998 | Blume et al. |
| 5,823,670 A | 10/1998 | Rushing et al. |
| 5,842,641 A | 12/1998 | Mazzalveri |
| 5,877,234 A | 3/1999 | Xu et al. |
| 5,922,398 A | 7/1999 | Hermes et al. |
| 5,989,331 A | 11/1999 | Bauer et al. |
| 6,002,488 A | 12/1999 | Berg et al. |
| 6,013,721 A | 1/2000 | Schall et al. |
| 6,074,474 A | 6/2000 | Broome et al. |
| 6,119,434 A * | 9/2000 | Andersson ............... 53/237 |
| 6,198,536 B1 | 3/2001 | Baker |
| 6,221,145 B1 | 4/2001 | McClain |
| 6,308,499 B1 | 10/2001 | Takada et al. |
| 6,366,742 B1 * | 4/2002 | Reihl et al. ............... 399/12 |
| 6,715,514 B2 * | 4/2004 | Parker et al. ............... 141/1 |
| 6,778,877 B2 * | 8/2004 | Ichikawa et al. ........... 700/213 |
| 6,883,561 B2 | 4/2005 | Bartholomew et al. |
| 7,065,429 B1 * | 6/2006 | McClain et al. ........... 700/239 |
| 7,096,894 B1 * | 8/2006 | Hollub et al. ............... 141/65 |
| 2001/0040127 A1 * | 11/2001 | Donig et al. .......... 210/321.71 |
| 2004/0158507 A1 * | 8/2004 | Meek et al. ............... 705/28 |
| 2006/0136091 A1 * | 6/2006 | Browne ............... 700/213 |
| 2006/0229764 A1 * | 10/2006 | Stefener et al. ........... 700/239 |
| 2008/0078829 A1 * | 4/2008 | Woodward ............... 235/376 |
| 2009/0302102 A1 * | 12/2009 | Nemet et al. ............... 235/376 |

FOREIGN PATENT DOCUMENTS

| | | |
|---|---|---|
| DE | 3910472 | 10/1989 |
| DE | 19714577 | 10/1998 |
| EP | 0614951 | 9/1994 |
| EP | 0706543 | 4/1996 |
| EP | 1094096 | 4/2001 |
| IE | 940666 | 3/1996 |
| JP | 59172559 | 9/1984 |
| WO | 9425238 | 11/1994 |
| WO | 9529960 | 11/1995 |
| WO | 9805417 | 2/1998 |
| WO | 0037568 | 6/2000 |
| WO | 0044834 | 8/2000 |

OTHER PUBLICATIONS

Hartman, Lauren R. "Bulk Shipments Get Colorful" Packaging Digest, May 1, 2002 [retrieved Aug. 31, 2010] Retrieved from the Internet <url:http://www.packagingdigest.com/article/print/342283-Bulk_shipments_get_colorful.php>, 3 pages.*

Patton, "Latex Critical Pigment Volume Concentration (LCPVC)", Paint Flow and Pigment Dispersion, 1979, p. 193.

Forsius, "Paint Production by Component Mixing", Faerg Lack Scand., 1997, 43(2), 5-6.

Dutheillet, "Integrated Solution to Build Batch Processing Plants for Blending & Formulation Industries", Chemical Engineering World, 1997 32(5), 37-44.

Orcun, et al., "Scheduling of Batch Processes: An Industrial Application in Paint Industry", Computers Chem. Enng., 1997, 21, S673-S678.

"Component Mixing—A New Approach to Customized Paint Production", High Technology Finland, 2000, 156-157.

Helander, "Benefits of delayed product differentiation", Reprinted from PPCJ, 1999.

Helander, "Impact of Form Postponement on Channel Members' Performance in Paint Business: A Theoretical Approach", LTA, 1999, p. 225-237.

PCT International Search Report; International Application No. PCT/US08/65566; International Filing Date Jun. 2, 2008.

* cited by examiner

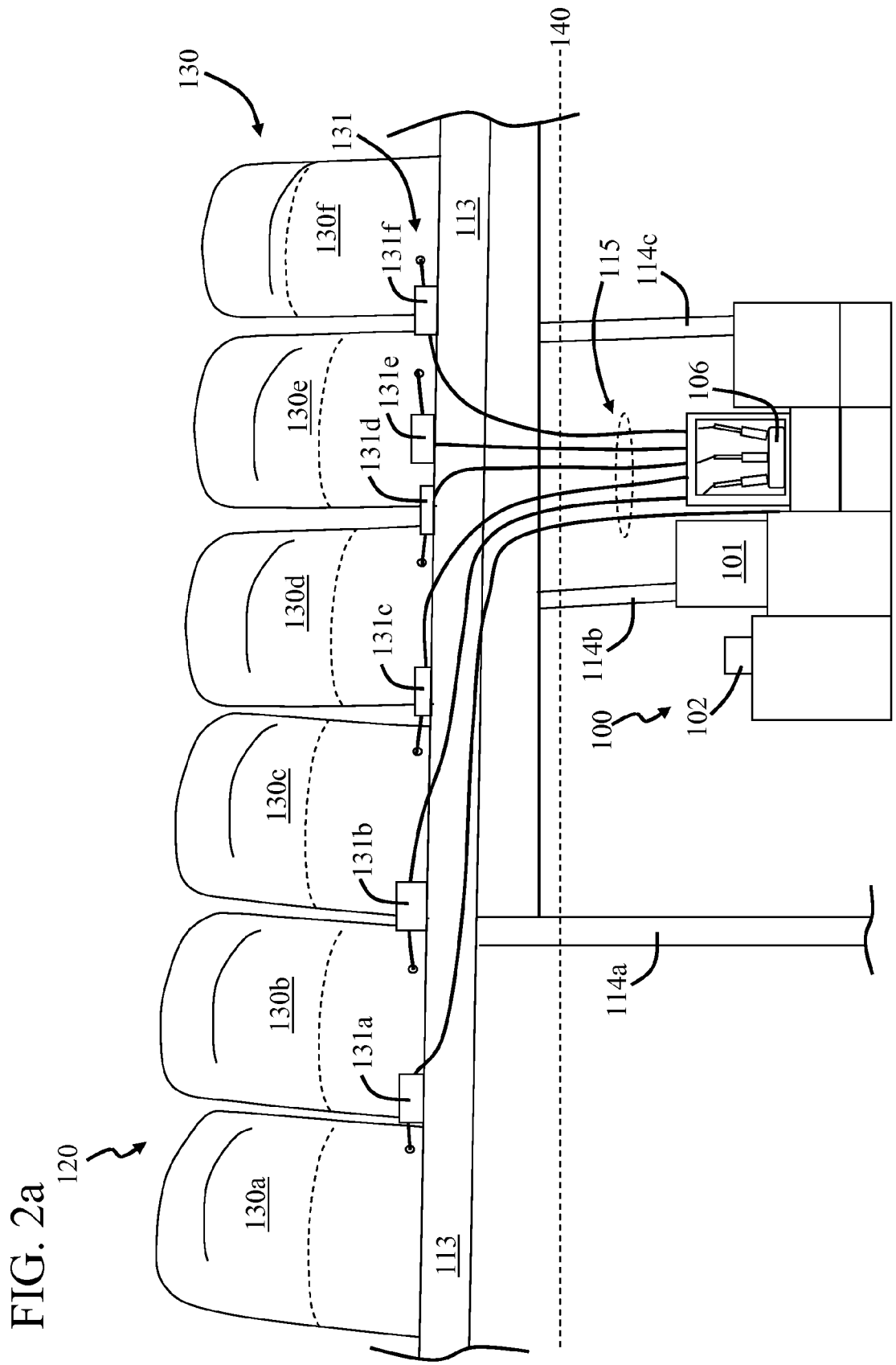

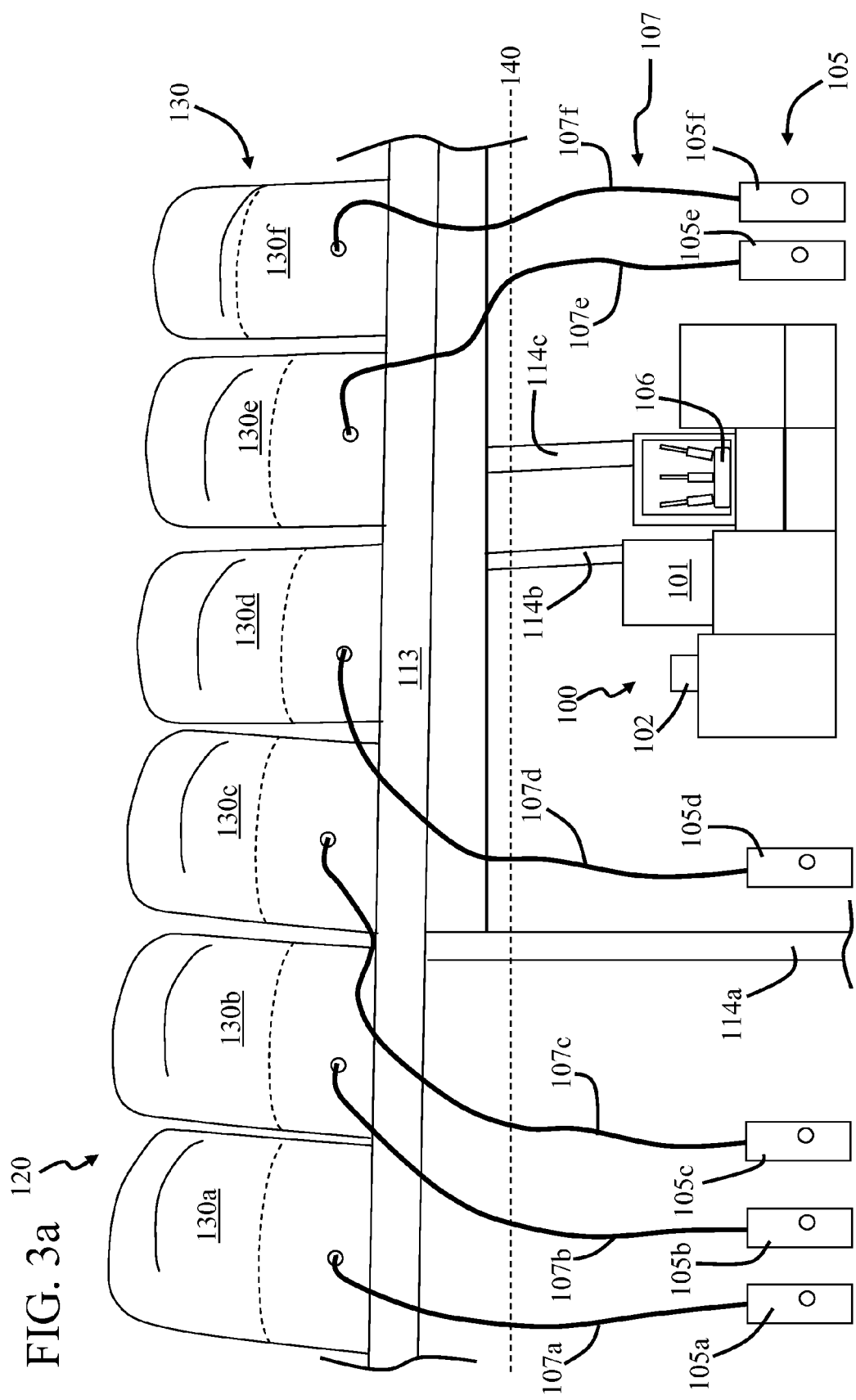

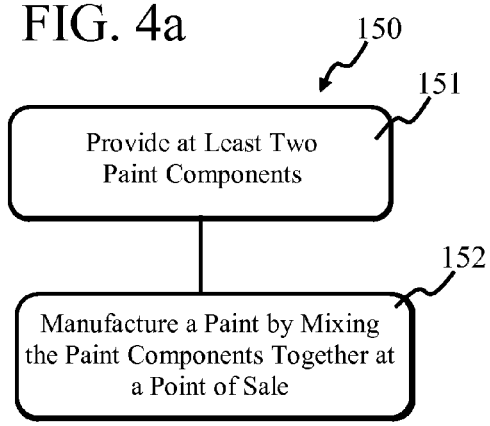
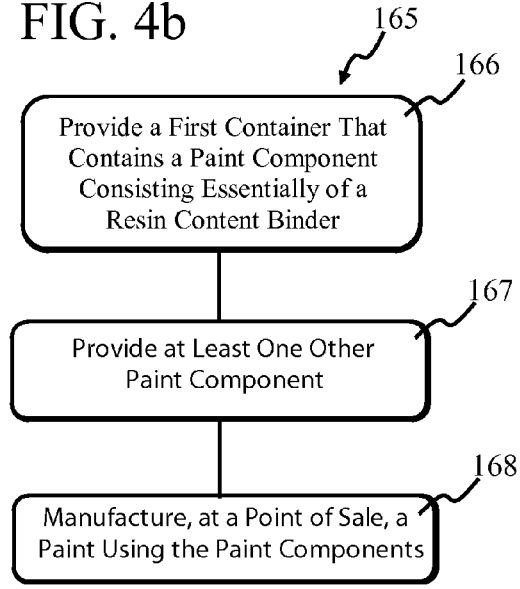
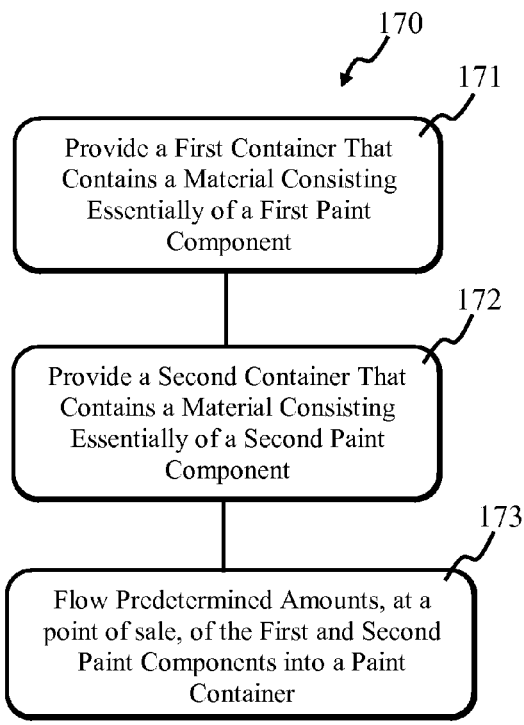
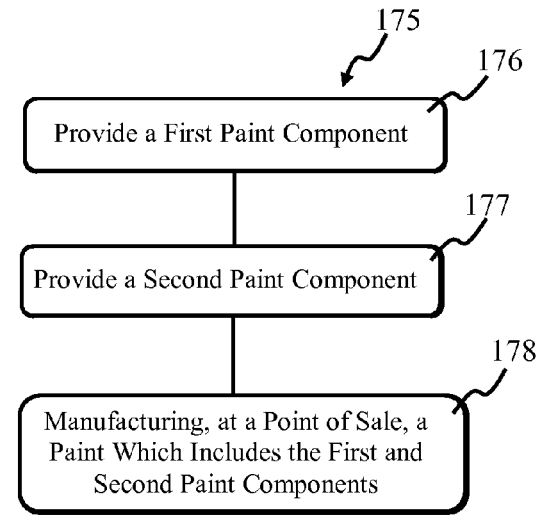

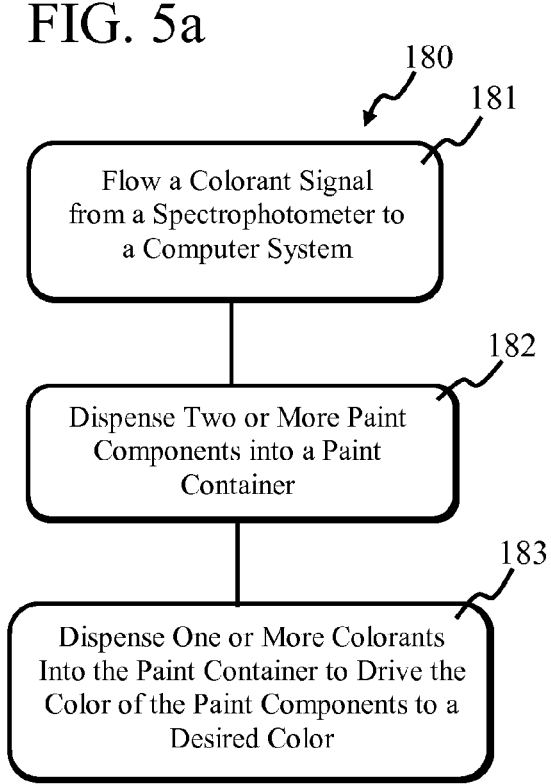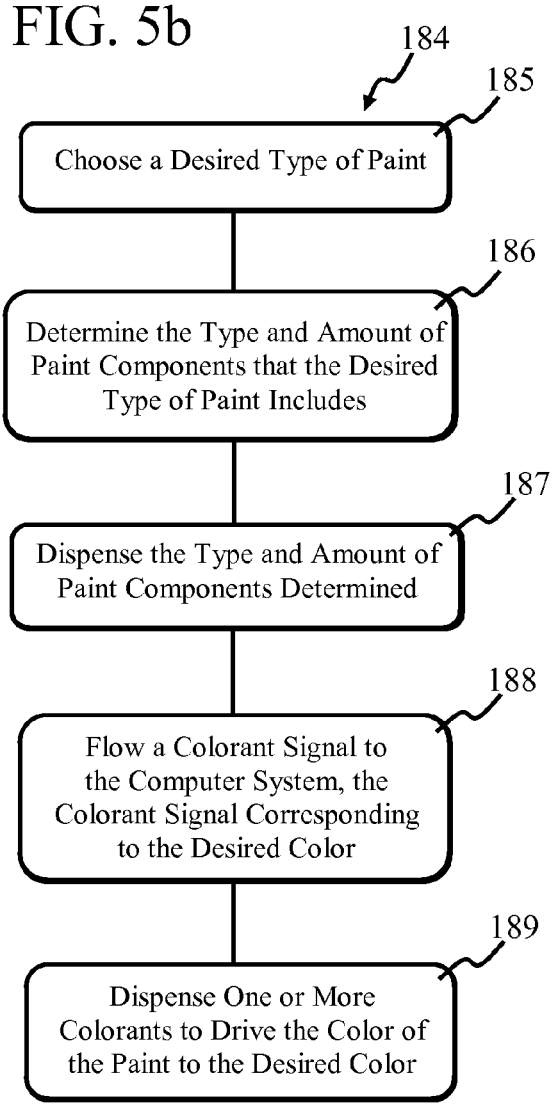

007# METHOD AND APPARATUS FOR MATCHING AMOUNT AND TYPE OF PAINT COMPONENT IN A PAINT MANUFACTURING SYSTEM

CROSS REFERENCE TO RELATED APPLICATION

This application is a continuation in part of U.S. patent application by Randall L. Hughes, Andrew B. Titus, Danny P. Boyle, and Michael Mowen entitled "METHOD AND APPARATUS FOR PRODUCING PAINT," Ser. No. 11/757,264, filed Jun. 1, 2007, the disclosure of which is hereby incorporated herein entirely by reference.

BACKGROUND OF THE INVENTION

1. Field of the Invention

This invention relates to the coatings industry and more specifically to the consistent on demand production of an aqueous paint having any end-use application characteristic from a plurality of prepaints at the point of sale within minutes of an operator's selection using a common automated computer controlled paint production apparatus for example.

2. Description of the Related Art

For decades now, paint has been manufactured, packaged, warehoused, and inventoried at large paint factories many miles from its final destination. A significant investment in paint factories, equipment, and ingredients is necessary to offer the large variety of paints desired by retailers and consumers. Because of this large investment, it has been economically necessary to limit paint factories to large-scale operations.

Paint is generally manufactured at a paint manufacturing factory and then transported in separate containers to a point of sale, wherein each container contains one type of paint. Different types of paint typically comprise different types of paint ingredients in various amounts. Conventional paint manufacturing processes require that the paint be made using extensive independent ingredients to create paint with the desired characteristics. Formulating paints is complex; it is not simply a matter of mixing a few paint ingredients in different ratios. Rather, it involves the selection and mixing of different paint ingredients in different ratios depending on the type of paint desired. The type and amount of paint ingredients included in the paint determines its characteristics, such as drying time, quality level, sheen, finish, texture, etc. For example, some types of paint have a flat finish and others have a high-gloss finish. This requires paint factories to store many different paint ingredients and change paint ingredients during manufacture depending on the specific paint type being prepared.

In conventional paint manufacturing processes in a paint factory, ingredients such as solvents, dispersants, surfactants, and defoamers (typically liquids) are placed into a mill, such as a high-speed disperser, according to a set formula for a paint to be made in that particular factory machine. The liquids are blended together to make a homogeneous mixture. Dry pigments are then added slowly to this mixture while the disperser is running at low speed until they are mixed into the liquid phase. The mill is then run at a high speed to shear the mixture and disperse the dry pigments to the desired particle size.

Upon approval of the pigment dispersion by the Quality Control Laboratory (typically referred to as the "grind" in the paint industry), the "let down" process begins. Storage for any significant period of time of the pigment dispersion results in settling and a non-uniform distribution of constituents throughout the premix. Consequently, the manufacturing processes are designed to limit the residence time of the pigment dispersion in the mill in order to promote the manufacture of more uniform products. One or more resins are then added to the pigment dispersion depending on the desired paint type. Other liquid or dry additives are added that yield properties such as proper film formation, open time, gloss, wetting, and many others. Finally, thickening agents are added to give the final desired end-use application characteristics.

Because these processes are different for each paint quality, sheen, color base type, and exterior/interior characteristic combination of paint produced, and because the process is time consuming, involves numerous consecutive steps and people, each machine is conventionally set up to produce one type of paint only. The produced paint is placed in a quart, one gallon, two gallon can or 5 gallon bucket and shipped to a retail store and stored until resale.

At the retail store, such as Home Depot, a customer selects a can of paint off the shelf that holds paint having the color base type, sheen, quality and exterior/interior characteristics needed by the customer. The customer may also request that a colorant be added to the paint in the can.

Because conventional paint is made at the factory and cannot practically be made at the store, retailers are forced to order, receive, warehouse, stock, and inventory hundreds of SKUs and thousands of buckets of paint in their stores in order to offer a range of paints. The transport and storage in the individual containers adds significantly to the cost of the sold product for it is necessary to inventory a wide variety of paints having different end-use application characteristics to satisfy and anticipate consumer demand, such as various sheen levels, tint bases, paints for exterior use, paints for interior use, and paints of varying quality. If too many cans of one type of paint are ordered, it may go to waste. While the paint cans are waiting to be purchased, they fill floor space that could have been used by other paints or products, and cost money to keep in the store. Sales may also be lost because not enough cans holding paint of one particular type is available from the premixed paint cans in the store.

Thus, there continues to be a long felt need to reduce paint factory equipment, and ingredient investment so that paint manufacturers may have more flexibility in locating their paint factories. There also continues to be a long felt need to reduce the variety of paint types that a retail store must stock, while still providing for the various paint types desired by consumers. Accordingly, what is needed are improved methods of formulating and consistently manufacturing paint having virtually any end-use application characteristic on demand at the factory, point of sale (e.g. retail store), and/or point of use (e.g. application sight) using a limited number of premixed paint ingredient compositions to prepare all of the different paint types desired, thus, minimizing the number and type of paint ingredients needed to make a range of paints.

BRIEF SUMMARY OF THE INVENTION

The present invention employs a paint manufacturing system for manufacturing a desired type and color of paint. The paint manufacturing system includes a paint component storage system and a colorant storage system. A dispenser is in fluid communication with the paint component and colorant storage systems. The paint component storage system is located above the dispenser. The paint manufacturing system also includes a spectrophotometer that is operatively coupled with a computer system. The computer system controls the flow of paint components from the paint component storage system and colorants from the colorant storage system.

The paint component storage system dispenses, through the dispenser, a desired combination of paint components in response to a paint type indication. The desired combination of paint components form a base paint. The colorant storage system dispenses, through the dispenser, a desired combination of colorants in response to a paint color indication. The colorants dispensed are chosen to drive the color of the base paint to a desired color. In this way, the desired type and color of paint is provided. In some situations, the computer system determines the colorants dispensed in response to a colorant signal from the spectrophotometer. In other situations, the computer system determines the colorants dispensed in response to the selection of a color data file.

In one embodiment of a paint manufacturing system configured according to an embodiment of the present invention, may consist of a paint component storage system; wherein the paint component storage system further comprises a plurality of paint component cartridges each containing a paint component; wherein at least two of the plurality of paint component cartridges contain the same paint component; a mass flow control system coupled to the paint component storage system; a dispenser coupled to said mass flow control system; and a computer system which controls a flow of paint components from the paint component storage system, the paint component storage system flowing a desired combination of paint components in response to a paint type indication.

The paint component storage system may have paint component containers instead of cartridges that hold the paint components. A method for a paint component container comprises: the paint manufacturing system requesting an amount and type of a paint component; filling a tote with the amount and type of paint component requested by the paint manufacturing system; creating a bar code to indicate the amount and type of paint component; transporting the tote and bar code to the point of sale where the paint manufacturing system is located; scanning the bar code; checking an amount of paint component remaining in the paint component container through a sensor coupled to the container; checking a type of paint component in the paint component container; accepting the tote if the amount and type of paint component match what is needed to fill the paint component container; declining the tote if the amount and type of paint component does not match what is needed to fill the paint component container; filling the paint component container if the tote was accepted; and verifying flow of the paint component from the tote to the paint component container. It is also possible to configure the connectors on the totes and the containers so that totes that carry a particular component have a connector that only couples with connectors for containers that house the same component.

These and other features, aspects, and advantages of the present invention will become better understood with reference to the following drawings and description.

BRIEF DESCRIPTION OF THE DRAWINGS

FIG. 1b is a perspective view of one embodiment of a dispenser, in accordance with the invention, included with the paint manufacturing system of FIG. 1a.

FIG. 1e is a perspective view of a colorant storage system, in accordance with the invention, included with the paint manufacturing system of FIG. 1a.

FIG. 2a is a perspective view of a paint manufacturing system, in accordance with the invention, which includes the paint manufacturing system of FIG. 1a.

FIG. 2b is a schematic diagram of the paint manufacturing system of FIG. 2a.

FIG. 2c is a perspective view of an elevated support structure included with the paint manufacturing system of FIG. 2a.

FIG. 3a is a perspective view of the paint manufacturing system of FIG. 2a with a pumping system, in accordance with the invention.

FIGS. 4a, 4b, 4c and 4d are block diagrams of a method of manufacturing a desired type of paint at a point of sale, in accordance with the invention.

FIGS. 5a and 5b are block diagrams of a method of manufacturing a desired type of paint at a point of sale, and providing it with a desired color, in accordance with the invention.

DETAILED DESCRIPTION OF THE INVENTION

Figure 1A:
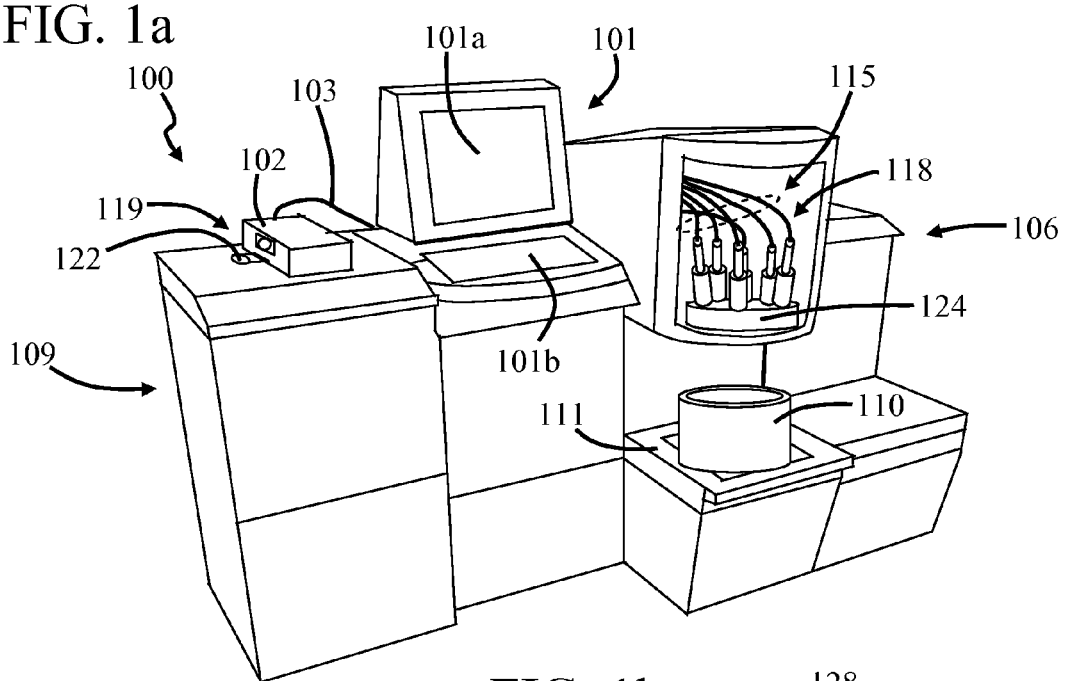
FIG. 1a is a perspective view of a paint manufacturing system, in accordance with the invention.

The present invention allows the manufacture of a desired type and color of paint at a point of sale. Manufacturing the paint at the point of sale is useful for several reasons, with one being that the desired paint can be manufactured in response to the desires of the consumer. Hence, the type and color of the paint can be selected by the consumer before the paint is manufactured. This allows the paint retailer to provide an "inventory on demand", wherein an inventory of paint is produced in response to an indication that the consumer wants a particular type and color of paint. If the type and color of the paint produced is desired, the consumer is more likely to purchase it. Hence, the consumer is more likely to want paint and to purchase it if the paint is manufactured at the point of sale.

Manufacturing the paint at the point of sale is also useful because the paint is made and sold shortly thereafter. Hence, there is no need to maintain an inventory of paint without a purchaser for it. There is also no need to keep an inventory of different types and colors of paint from which the consumer makes a selection. It is also no longer necessary to keep track of changes in the inventory of paint. Manufacturing the paint at the point of sale is also useful because the paint manufacturing system used can occupy less space than the inventory of paint.

To increase the likelihood of the consumer making a paint purchase, a large number of different types and colors of paint need to be kept in inventory to increase the likelihood that the paint the consumer wants is available. However, the amount of space used to store the paint increases as the amount of different types and/or colors of paint in the inventory increases. It is generally desirable to decrease the amount of space used to store the paint because this space costs money and may be more useful for other purposes, such as the sale of goods and/or services. Space used for the sale of goods and services typically generates more income than space used for storing paint.

Manufacturing the paint at the point of sale is also useful because of the decreased time the paint is stored. This is useful because paint is more likely to degrade as the time it is stored increases. The paint can degrade in many different ways, such as by settling. The paint can also degrade if it experiences undesirable temperature and humidity changes. If the paint degrades too much, it can be unsatisfactory for use. The paint can be unsatisfactory for use in many different ways, such as if its color undesirably changes or if the amount of paint components included therein changes. The amount of paint components in the paint can undesirably change in many different ways, such as by evaporation. Some paint components evaporate faster than others, so the relative amounts of the paint components changes over time. If the relative amounts of the paint components change too much, the paint may be unsuitable for its intended purpose, such as for indoor or outdoor use. Hence, it is desirable to decrease the time between manufacturing and selling the paint, as well as the time between manufacturing and using the paint.

It should be noted that paint can include many different paint components, but it generally includes two or more. Each paint component typically includes many different types of materials combined together. It should also be noted that the paint components can be stored separately from each other for longer periods of time than a paint composed of them. Further, the paint components do not degrade as quickly as paint composed of them will. Hence, it is desirable to store paint components in separate containers instead of in the same container, as is done with paint composed of the components.

Examples of paint components typically used to make paint include resin, pigment composition, and dispersant thickening agent. The resin can be a material with a high or low resin content, wherein the high resin content material includes more resin than the low resin content material. These paint components often include water as the solvent, so they are considered to be aqueous based. The paint components are combined together in different amounts to provide a base paint, which is often colored to provide a desired type and color of paint. The paint components can be combined together in many different ways, such as by mixing.

There are many different types of base paints that can be made from the paint components. In one embodiment, the types of base paints include pastel, tinting, deep tone and neutral base paints. The pastel base paint has the lightest color and the neutral base paint has the darkest color. Further, the tinting base paint is lighter than the deep tone base paint, but darker than the pastel base paint. The deep tone base paint is darker than the tinting base paint, but lighter than the neutral base paint. These base paints are generally provided with a desired quality level and sheen. It should be noted that four types of base paints are discussed here for illustrative purposes. However, another number of base paints, such as pastel, tinting and neutral, can also be used.

In accordance with the invention, one or more colorants are combined with the base paint to provide it with the desired color. Hence, the desired paint generally includes the base paint and one or more colorants combined therewith. The colorant(s) are combined with the base paint by combining them with the paint components included therein. In this way, the color of the base paint is driven to the desired color. The colorant(s) can be combined with the paint components in many different ways, such as by mixing. In this way, a desired type of paint is manufactured and provided with a desired color at the point of sale.

FIG. 1*a* is a perspective view of a paint manufacturing system 100, in accordance with the invention. It should be noted that paint manufacturing system 100 is generally located at a point of sale. The point of sale can be at many different locations, such as a store and a warehouse. Examples of stores include paint stores, as well as hardware and home improvement stores. The store is generally a retail store which provides the sale of goods and/or services.

In this embodiment, paint manufacturing system 100 includes a computer system 101 which includes a monitor 101*a* and an input device 101*b*. In one example, monitor 101*a* is embodied as a touch-screen monitor and input device 101*b* is embodied as a keyboard. Computer system 101 operates software that controls the operation of several paint manufacturing system components. These paint manufacturing system components allow system 100 to provide the desired type and color of paint at the point of sale, as will be discussed in more detail below. The type and color of the paint is determined by the paint components and colorants included therein. The paint components and colorants are predetermined in response to one or more indications provided to computer system 101. The indications are generally provided to computer system 101 through monitor 101*a* and/or input device 101*b*.

In this embodiment, paint manufacturing system 100 includes a dispenser 106 which is controlled by computer system 101. Dispenser 106 dispenses materials which form the paint. These materials can be of many different types, such as the paint components and colorants mentioned above. Dispenser 106 includes paint component nozzles 118 supported by a nozzle support structure 124. Nozzles 118 dispense pre-selected paint components in response to an indication from computer system 101. Nozzles 118 are connected to a paint component storage system (not shown) through a plumbing system 115. Plumbing system 115 includes hoses which allow paint components to flow between the paint component storage system and paint component nozzles 118 in response to an indication from computer system 101.

The paint components are dispensed through paint component nozzles 118 and into a paint container 110. Paint container 110 can be of many different types, such as a paint bucket, which allows the paint to be contained and carried away from the point of sale. In this embodiment, paint container 110 is supported on a paint weight scale 111, which determines the weight of paint container 110 combined with the weight of the material dispensed through dispenser 106. Scale 111 can be of many different types, such as the PANTHER and PANTHER PLUS weighing terminals made by Mettler Toledo of Toledo, Ohio.

Figure 1B:
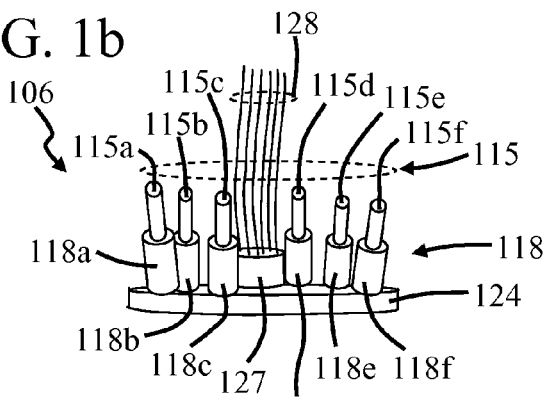
Figure 1C:
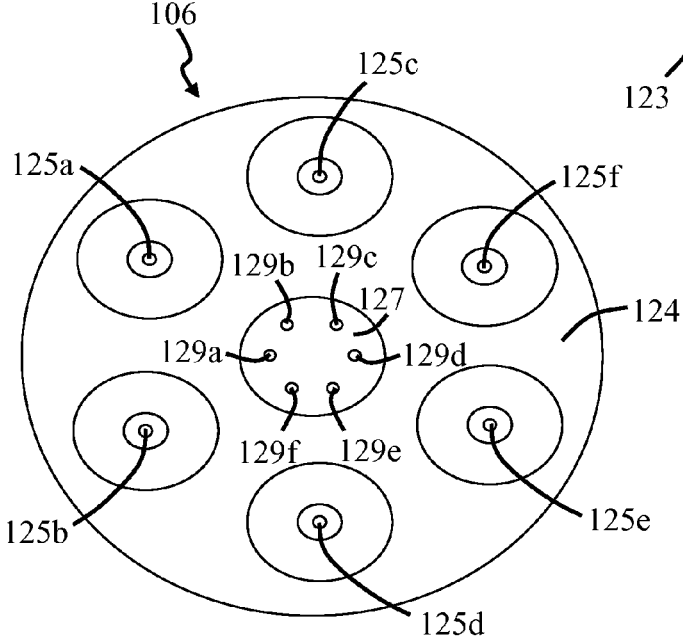
FIG. 1c is a bottom view of a support structure included with the dispenser of FIG. 1b.

FIG. 1*b* is a perspective view of one embodiment of dispenser 106, in accordance with the invention. FIG. 1*c* is a bottom view of nozzle support structure 124 looking in a direction 123. In this embodiment, paint component nozzles 118 includes six paint component nozzles, denoted as nozzles 118*a*, 118*b*, 118*c*, 118*d*, 118*e* and 118*f*. Nozzles 118*a*, 118*b*, 118*c*, 118*d*, 118*e* and 118*f* are supported by nozzle support structure 124 and are in fluid communication with the paint component storage system (not shown) through hoses 115*a*, 115*b*, 115*c*, 115*d*, 115*e* and 115*f*, respectively. It should be noted that hoses 115*a*-115*f* are included in plumbing system 115 and terminate at openings 125*a*, 125*b*, 125*c*, 125*d*, 125*e* and 125*f*, respectively, as shown in FIG. 1*c*. Openings 125*a*-125*f* extend through a bottom surface of nozzle support structure 124 so that the respective paint components can be outputted through them and into paint container 110.

In this embodiment, dispenser 106 includes a colorant nozzle 127 carried by nozzle support structure 124. Colorant nozzle 127 is connected to a colorant storage system (not shown) through a plumbing system 128. As shown in FIG. 1*d*, plumbing system 128 includes hoses 128*a*, 128*b*, 128*c*, 128*d*, 128*e* and 128*f* which extend there through nozzle 127 and terminate at openings 129*a*, 129*b*, 129*c*, 129*d*, 129*e* and 129*f*, respectively, as shown in FIG. 1*c*. It should be noted that FIG. 1*d* is a perspective view of colorant nozzle 127. Plumbing system 128 allows colorant components to flow between the colorant storage system and colorant nozzle 127. The colorant components are dispensed through openings 129*a*-129*f* and into paint container 110 wherein they are combined with the paint components. The colorant storage system will be discussed in more detail presently.

Figure 1E:
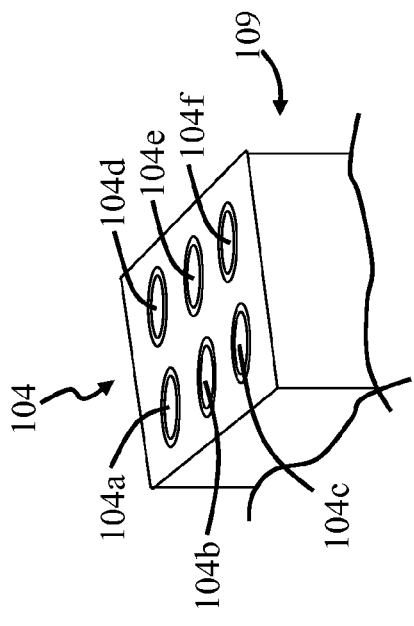
Figure 1D:
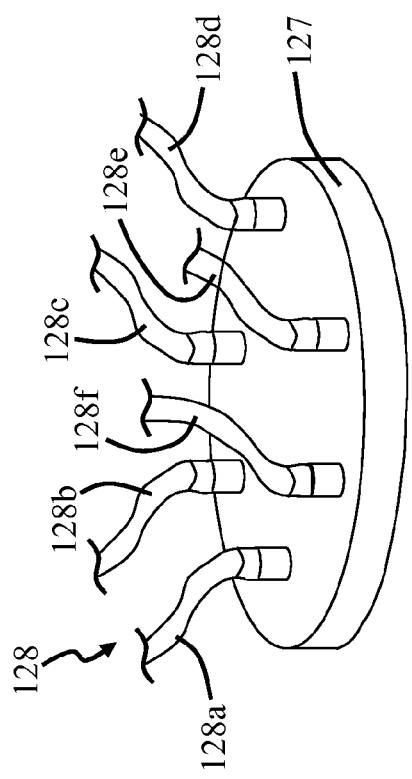
FIG. 1d is a perspective view of a colorant nozzle included with the dispenser of FIG. 1b.
Figure 1F:
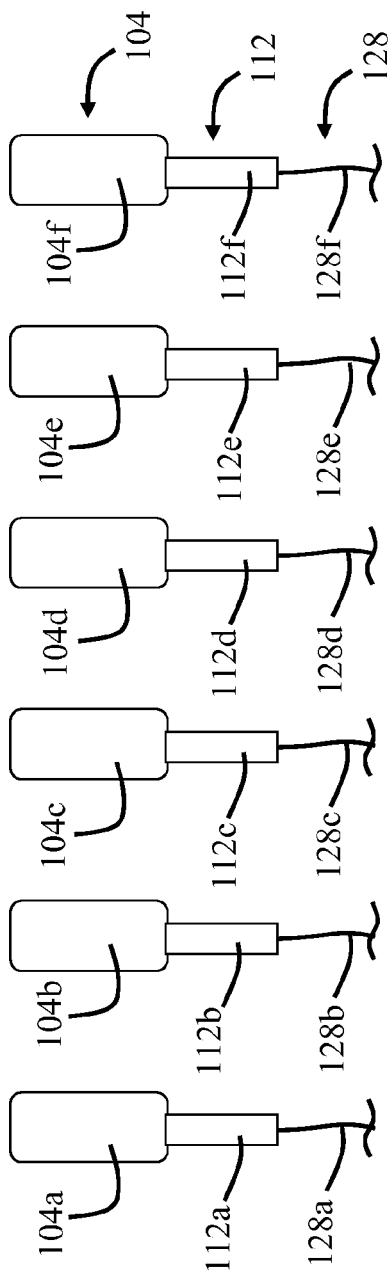
FIG. 1f is a schematic diagram of the colorant storage system of FIG. 1e.

FIG. 1*e* is a perspective view of one embodiment of a colorant storage system 104, in accordance with the invention, and FIG. 1*f* is a schematic diagram of colorant storage system 104. It should be noted that colorant storage system 104 is housed by paint manufacturing system 100 in a colorant storage cabinet 109, as shown in FIG. 1*a*, although it could be positioned elsewhere. In this embodiment, colorant storage system 104 is connected to plumbing system 128 through a mass flow control system 112. Colorant storage system 104 includes colorant storage containers 104*a*, 104*b*, 104*c*, 104*d*, 104*e* and 104*f* and mass flow control system 112 includes mass flow controllers 112*a*, 112*b*, 112*c*, 112*d*, 112*e* and 112*f*. Colorant storage containers 104*a*, 104*b*, 104*c*, 104*d*, 104*e* and 104*f* are connected to hoses 128*a*, 128*b*, 128*c*, 128*d*, 128*e* and 128*f*, respectively, through mass flow controllers 112*a*, 112*b*, 112*c*, 112*d*, 112*e* and 112*f*, respectively.

Colorant containers 104*a*-104*f* each contain a colorant which can be flowed into paint container 110 through hoses 128*a*-128*f* and openings 129*a*-129*f* (FIG. 1*c*), as discussed above, where they are combined with the paint components contained therein. In this way, the color of the paint components contained in container 110 is driven to the desired color.

It should be noted that, in this embodiment, colorant storage system 104 is shown as including six colorant containers for illustrative purposes, so it can provide six colors, as well as their corresponding color combinations. A color combination is two or more colors combined together to provide a shade of color. The two or more colors can be combined together in many different ways, such as by mixing. In other embodiments, however, colorant storage system 104 includes fewer or more colorants. For example, in one particular embodiment, colorant storage system 104 includes twelve colorant containers, so it can provide twelve colors, as well as their corresponding color combinations. In general, the number of colorant containers included in colorant storage system 104 determines the number of different colors and shades of colors that can be provided. The number of different colors and shades of colors that can be provided increases with the number of colorant containers. Further, the number of different colors and shades of colors that can be provided decreases with the number of colorant containers. The amount and colors of colorants flowed into paint container 110 can be determined in many different ways, a few of which will be discussed in more detail presently.

In operation, computer system 101 has access to a paint data file. The paint data file generally includes paint color and paint type information which can be read and changed, if desired, by computer system 101. However, the paint color and paint type information can be included with a paint color data file and a paint type data file, respectively, so that the paint data file includes separate data files.

The paint data file can be an existing data file, or it can be created or changed in response to the paint type and/or paint color indication provided to computer system 101. Further, the color and paint type data files can be existing data files, or they can be created or changed in response to the paint color and paint type indications, respectively. The paint data file, color data file and/or paint type data file can be stored internally with computer system 101 or externally to it.

The color data file includes paint color information that corresponds to the desired color of the paint manufactured with paint manufacturing system 100. The paint color information often represents the desired color in terms of a particular color scale. There are many different color scales that can be used to represent the desired color, with one being the Hunter color scale. The Hunter color scale represents colors with three color values, denoted as L, a and b. Hence, the paint color information can include L, a and b values corresponding to the desired color.

The paint type data file includes paint type information that corresponds to the desired type of the paint manufactured with paint manufacturing system 100. It should be noted that the desired type of paint includes a base paint, and the base paint depends on the desired color of paint. This is because the colorants are combined with the base paint to provide the paint with a desired shade of color. For example, if a dark color is desired, the paint type indication generally corresponds to a neutral base paint. If a light color is desired, the paint type indication generally corresponds to a pastel base paint. Colorants are combined with the base paint to provide a shade of color between pastel and neutral. Hence, the paint color indication depends on the paint type indication and the color data file depends on the paint type data file.

The paint type and paint color indications can be provided to computer system 101 in many different ways, such as by providing corresponding input through monitor 101*a* and/or input device 101*b*. The paint type and paint color indications are generally provided to computer system 101 in response to an indication that a customer desires a particular type and color of paint.

In one embodiment, paint type and paint color data files are selected in response to the paint type and paint color indications, respectively, provided to computer system 101. The paint type and paint color indications can be provided to computer system 101 in many different ways, such as by providing corresponding input through monitor 101*a* and/or input device 101*b*.

In one situation, the paint type and paint color indications are provided to computer system 101 in response to one or more inputs provided through monitor 101*a* and/or input device 101*b*. In response to the paint type indication, a paint type data file is selected. The selected paint type data file corresponds to a base paint having a color associated with the color indicated by the paint color indication. In response to the desired paint color indication, a color data file is selected. The selected color data file corresponds to the type and amount of colorants that will drive the color of the base paint, when combined therewith, to the desired color. In this way, the desired type of paint having the desired color is manufactured by using paint manufacturing system 100. In other situations, however, the paint color indication is provided to computer system 101 with a colorant signal, as will be discussed in more detail presently.

As shown in FIG. 1*a*, paint manufacturing system 100 includes a spectrophotometer 102 in communication with computer system 101. Spectrophotometer 102 can be in communication with computer system 101 in many different ways, but a cable 103 is used here. In this way, computer system 101 and spectrophotometer 102 are operatively coupled together so signals can flow between them. Spectrophotometer 102 can be of many different types, such as those available from Greta Macbeth, MatchRite and Datacolor. Examples of spectrophotometers are also disclosed in U.S. Pat. Nos. 6,002,488 and 6,198,536.

Spectrophotometer 102 includes a sample holder 119 for holding a color sample 122. Color sample 122 can be of many different types, but it is often a color card corresponding to the desired color. In this way, the color of color sample 122 corresponds to the desired color of paint to be manufactured using paint manufacturing system 100.

In operation, spectrophotometer 102 flows a colorant signal $S_{Colorant}$ to computer system 101 through cable 103, wherein colorant signal $S_{Colorant}$ corresponds to the reflectance of color sample 122. The reflectance of color sample 122 corresponds to its paint color information. In response to colorant signal $S_{Colorant}$, computer system 101 stores the paint color information. The paint color information can be stored in many different locations, such as with the paint data file or an existing or created color data file. In this way, computer system 101 has access to paint color information corresponding to the color of color sample 122.

Once computer system 101 has access to the desired paint type and color information, computer system 101 determines the paint components and colorants needed to drive the color of the paint components to match the desired color. In this way, computer system 101 determines the paint components and colorants needed to drive the color of the base paint to match the desired color. It should be noted that, in accordance with the invention, the paint components and colorants are determined before they are dispensed.

After the paint type and colorants have been determined, computer system 101 provides an indication to mass flow control system 131 so that paint component storage system 130 dispenses the selected paint components. The selected paint components are dispensed by dispenser 106 to form the base paint, which is contained by container 110. Computer system 101 also provides an indication to mass flow control system 112 so that colorant storage system 104 dispenses the selected colorants. The selected colorants are dispensed by dispenser 106 into container 110 to drive the color of the base paint to match the desired color. If the color indication is provided by selecting the color data file, the color is driven to match the color corresponding to the paint color information included therein. If the color indication is provided by signal $S_{Colorant}$, the color is driven to match the color of color sample 122. In this way, the paint color indication can be provided to computer system 101 by using a spectrophotometer and a color sample.

It should be noted that the colorants can be selected in many different ways. For example, they can be selected to provide a desired accuracy in matching the color of the paint to the color of color sample 122. The colorants can also be selected based on cost. This is useful because some colorants are more expensive than others. Hence, the colorants can be selected to reduce costs, as well as the accuracy in color matching. The colorants can also be chosen in response to a desired use. For example, some colorants are better suited for outdoor use and other colorants are better suited for indoor use.

Figure 2B:
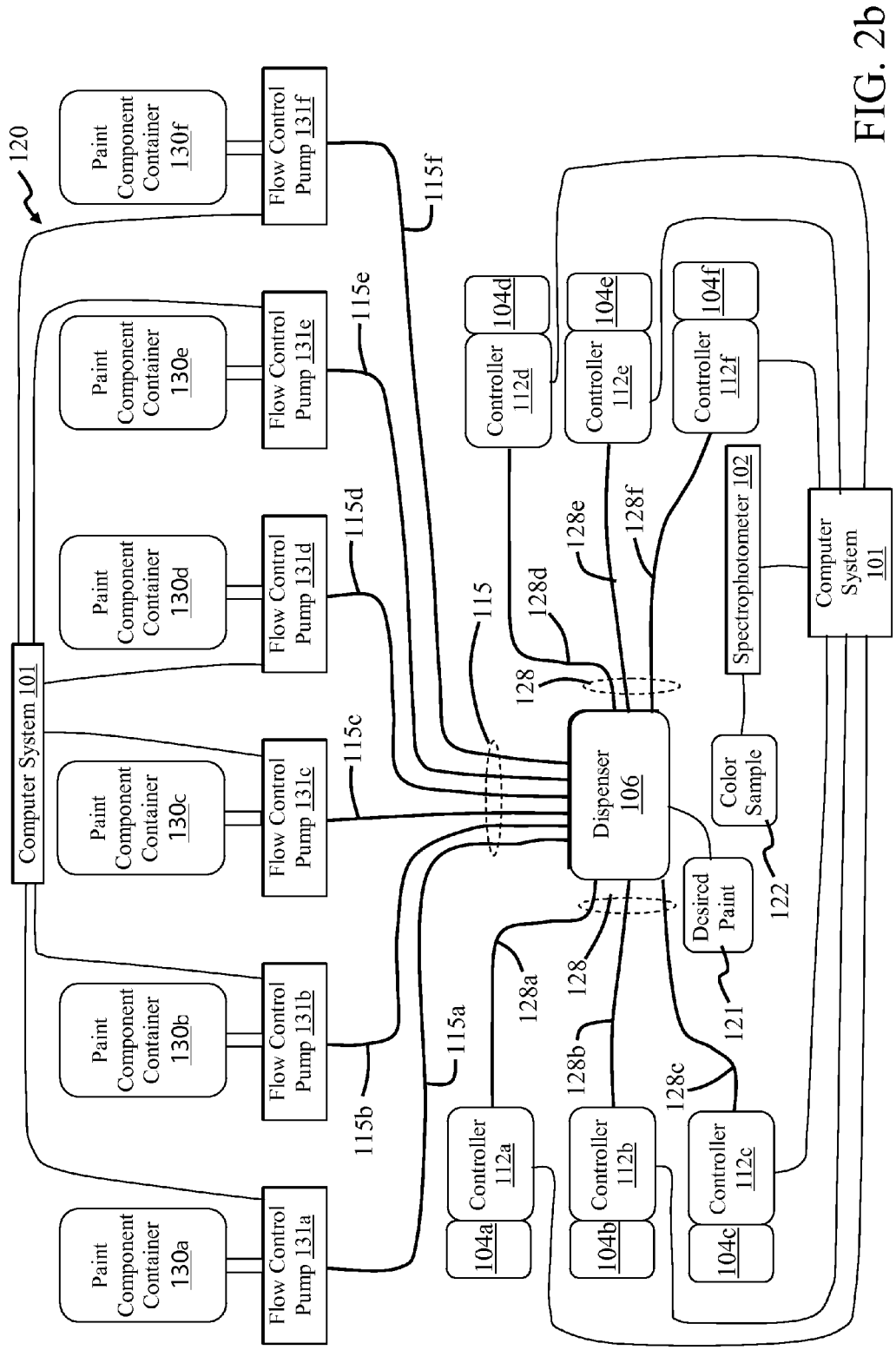

FIG. 2a is a perspective view of a paint manufacturing system 120, in accordance with the invention, and FIG. 2b is a schematic diagram of paint manufacturing system 120. In this embodiment, paint manufacturing system 120 includes paint manufacturing system 100 and a paint component storage system 130 in fluid communication with each other through plumbing system 115. Paint component storage system 130 includes paint component containers 130a, 130b, 130c, 130d, 130e and 130f. It should be noted that six paint component containers are shown in this embodiment, but there are generally two or more. The number of paint storage containers corresponds to the number of paint components. In one particular example, containers 130a, 130b, 130c and 130d each contain the pigment composition, dispersant thickening agent, high resin content binder and low resin content binder, respectively.

In this embodiment, paint component storage system 130 is in fluid communication with plumbing system 115 through a mass flow controller system 131. Mass flow controller system 131 includes mass flow controllers 131a, 131b, 131c, 131d, 131e and 131f. As shown in FIG. 2b, paint component containers 130a, 130b, 130c, 130d, 130e and 130f are in fluid communication with hoses 115a, 115b, 115c, 115d, 115e and 115f, respectively through mass flow controllers 131a, 131b, 131c, 131d, 131e and 131f, respectively. The operation of mass flow controllers 131a-131f is controlled by computer system 101. As discussed in more detail above, hoses 115a, 115b, 115c, 115d, 115e and 115f are connected to paint component dispensing nozzles 118a, 118b, 118c, 118d, 118e and 118f, respectively, of dispenser 106.

Figure 7:
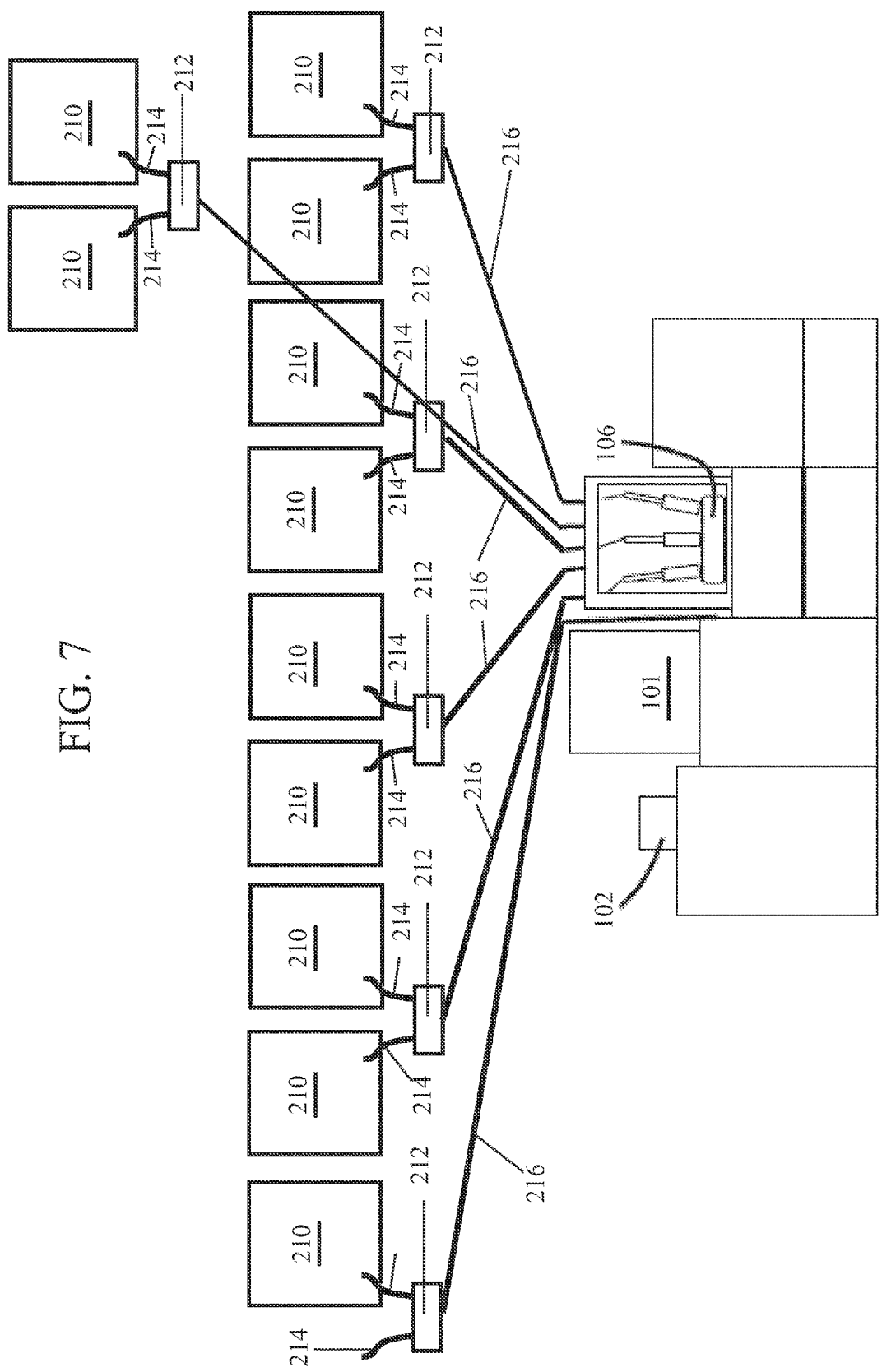
FIG. 7 is a perspective view of a paint manufacturing system comprising cartridges, in accordance with the invention.

In alternate embodiments of the present invention as shown in FIG. 7, the paint component containers may be replaced with a plurality of paint component cartridges 210. The paint component cartridges 210 may be configured as a tote (see FIG. 3b 117). A tote is a transport container for paint components which will be discussed in more detail later on. The paint component cartridges 210 may be totes which hold anywhere from 220 to 330 gallons of paint component. Two paint component cartridges 210 could be used to replace each paint component container in the paint component storage system. The two paint component cartridges 210 would be fluidly coupled to a mass flow controller 212 by hoses 214. The mass flow controller 212 is then coupled to the dispenser 106 by hoses 216.

In operation, the mass flow controller 212 would flow paint components from one of the two cartridges 210 containing a particular paint component. The paint component travels through hose 214 and then through hose 216 to the dispenser 106. When the cartridge 210 being used is empty, the mass flow controller 212 automatically switches to the other cartridge 210. The first cartridge 210 may then be replaced without interrupting paint manufacturing.

In particular embodiments of the present invention, the cartridge 210 may be replaced by simply removing the old cartridge 210 and placing a new cartridge 210 into position. The system would then automatically access the paint component in the cartridge 210.

As an example, two cartridges 210 of each paint component were used, however, as many cartridges 210 of each paint component may be used as desired. In order to aid in maintaining an inventory, each of these plurality of paint component cartridges 210 may be marked with a bar code, which when scanned contains information about the type of paint component and the amount of paint component contained in the cartridge 210.

Figure 3B:
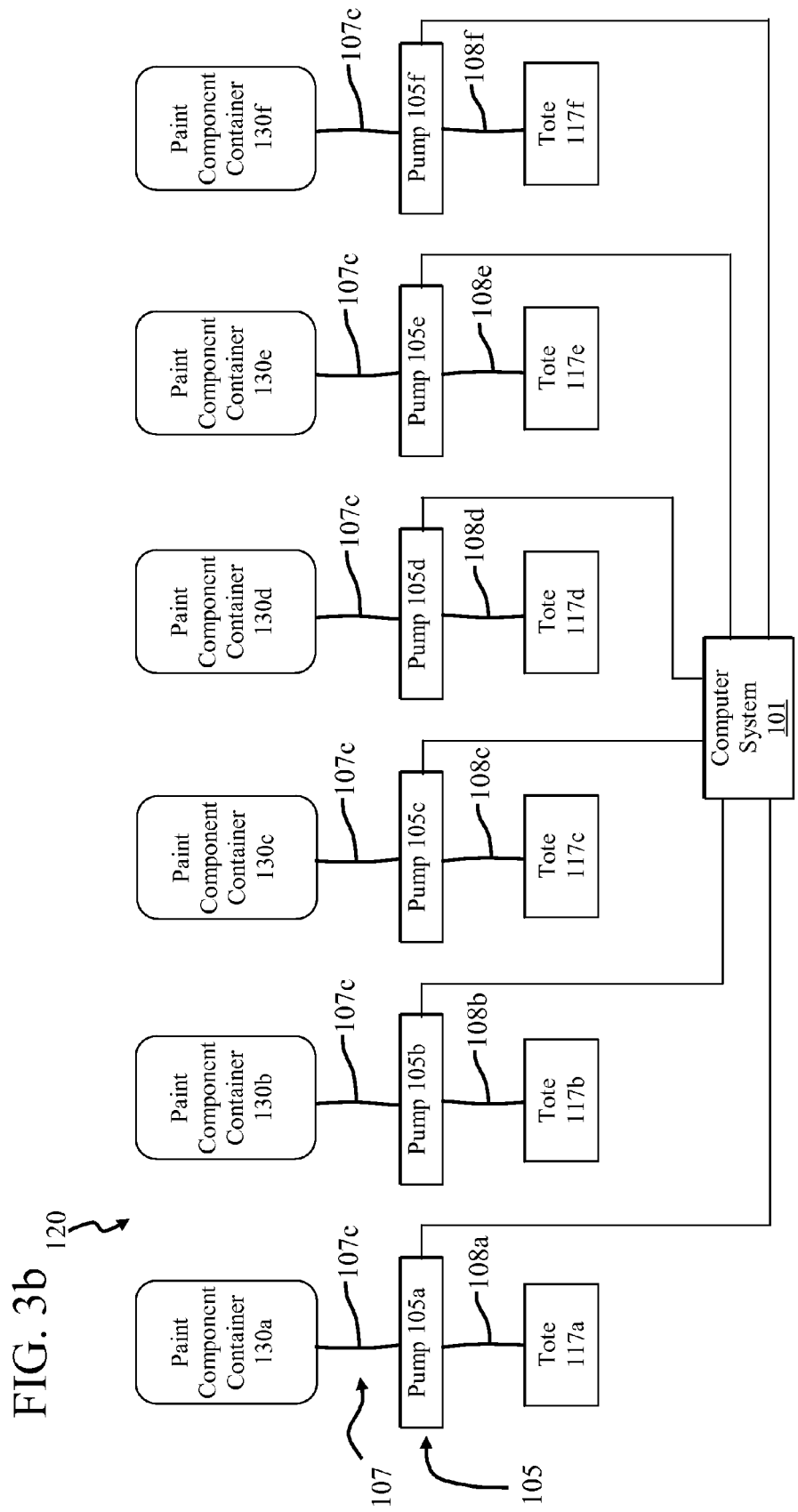
FIG. 3b is a schematic diagram of the paint manufacturing system of FIG. 2a with paint component transport containers.
Figure 3C:
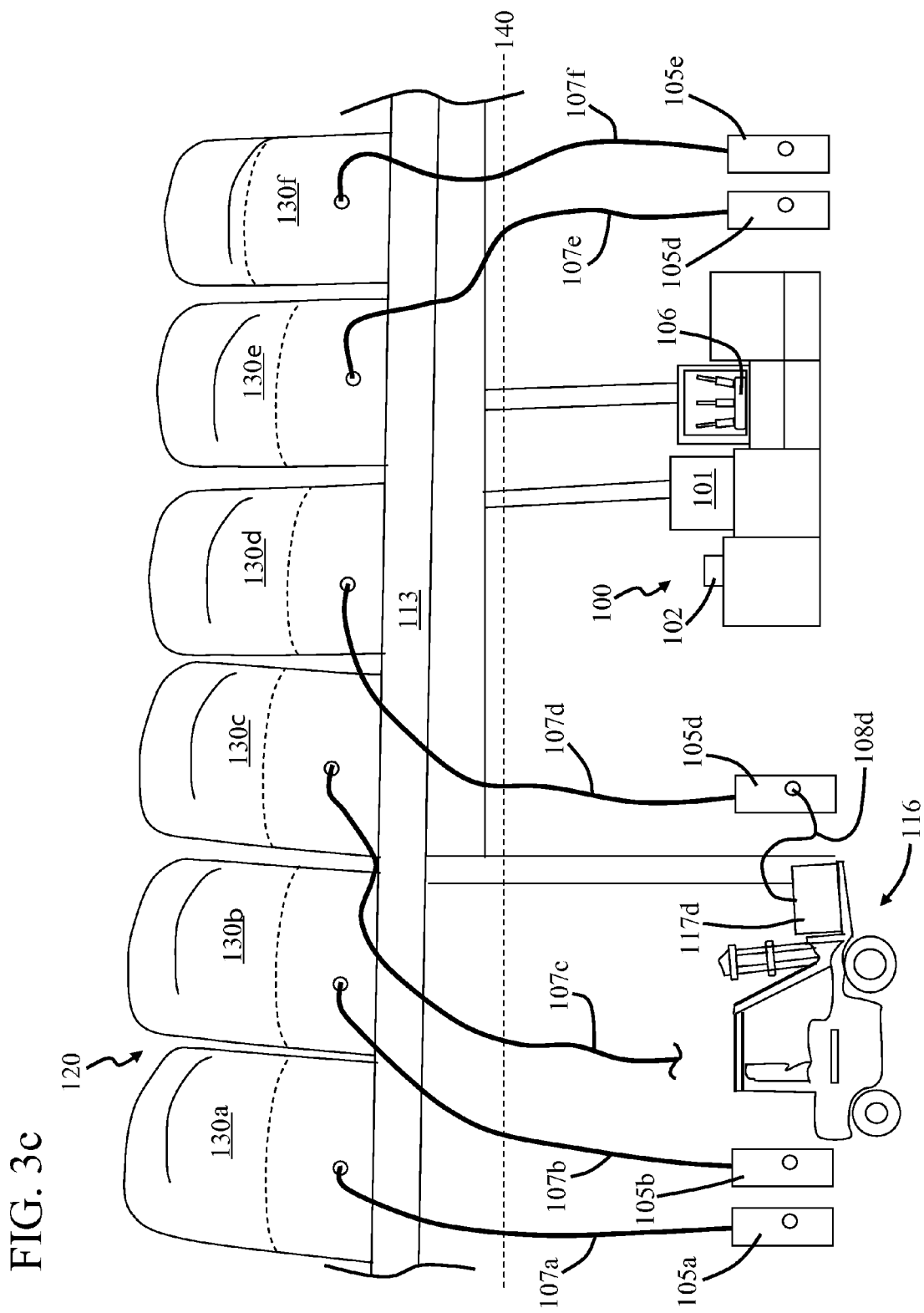
FIG. 3c is a perspective view of the paint manufacturing system of FIG. 3a, wherein the pumping system is connected to a tote carried by a fork lift.

As seen in FIGS. 3a and 3c, paint component storage system 130 can be positioned at many different locations. In this embodiment, paint component storage system 130 is positioned above dispenser 106 and above paint manufacturing system 100. In this way, paint component storage system 130 is positioned above a level 140 which extends between paint component storage system 130 and paint manufacturing system 100. Hence, level 140 extends above paint manufacturing system 100 and below paint component storage system 130. Hence, the flow of paint components between paint component storage system 130 and paint manufacturing system 100 is from a position above level 140 to a position below it.

It should be noted that paint component storage system 130 can be positioned at many other locations. For example, in some embodiments, it can be positioned below dispenser 106 and below paint manufacturing system 100. Paint component storage system 130 can also be positioned so it is level with dispenser 106 and/or paint manufacturing system 100. However, these embodiments are not shown here for simplicity.

It should also be noted that, in this embodiment, all of paint component storage containers 130a, 130b, 130c, 130d, 130e and 130f are positioned above level 140. However, in other embodiments one or more of them are positioned above level 140 and the others are not. Further, mass flow controller system 131 is also positioned above level 140. However, one or more of the mass flow controllers included therein can be positioned level with or below level 140, if desired.

Paint component storage system 130 is positioned above paint manufacturing system 100 for many different reasons. One reason is that it occupies space that would otherwise not be used. If paint component storage system 130 is positioned on the floor that supports paint manufacturing system 100, then it is occupying space that could be used for other purposes, such as the sale of goods and/or services.

Another reason paint component storage system 130 is positioned above paint manufacturing system 100 is that paint components can be flowed into paint component storage containers 130a-130f without interrupting the operation of paint manufacturing system 100. For example, the operation of paint manufacturing system 100 could be interrupted with the loading of paint components into paint component storage system 130. Further, the levels of the paint components stored by paint component storage system 130 can be more easily monitored because containers 130a-130f are positioned where they can be more easily seen.

Other advantages to positioning the paint component storage system 130 above the dispenser 106, are it prevents consumers from having access to the paint components which increases safety. In order to prevent consumers from having access to the paint components, it may be desirable to position the paint component storage system at least six feet above the ground. The added height of having the paint component storage system 130 located above the dispenser 106, helps to keep pump heads primed in the pumping system. This can be a significant benefit when dealing with paint components with higher viscosities. The height also helps increase the ease and speed of the flow of the paint components to the dispenser. The height also pulls down on vacuum pump in the pumping system which helps flow.

Paint component storage system 130 can be positioned above paint manufacturing system 100 in many different ways. For example, paint component storage system 130 can be positioned on a floor above the floor supporting paint manufacturing system 100. For the embodiment wherein paint component storage system 130 is positioned below paint manufacturing system 100, paint component storage system 130 can be positioned on a floor below the floor supporting paint manufacturing system 100.

In this embodiment, however, paint component storage system 130 is carried by an elevated support structure 113 which is elevated by support legs, some of which are denoted as support legs 114a, 114b and 114c. It should be noted that elevated support structure 113 can have many different configurations, one of which will be discussed in more detail presently.

Figure 2C:
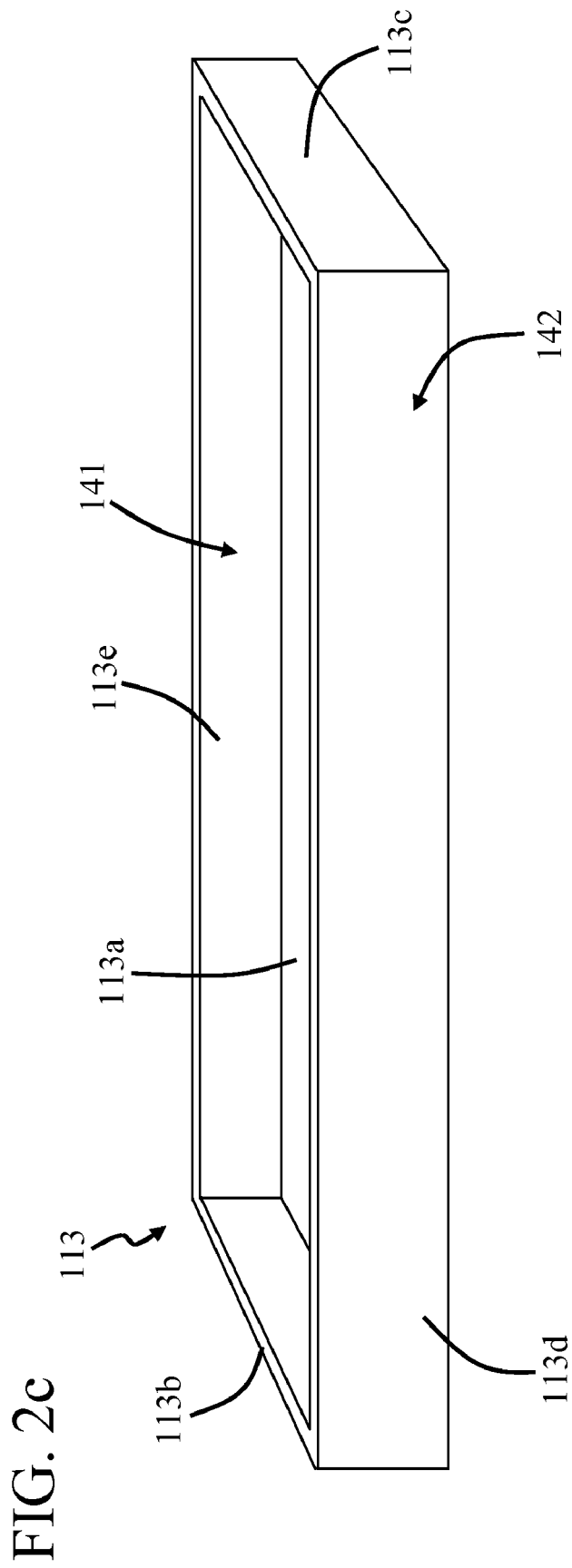

FIG. 2c is a perspective view of one embodiment of elevated support structure 113. In this embodiment, elevated support structure 113 includes a floor 113a and sidewalls 113b, 113c, 113d and 113e extending upwardly therefrom. Sidewalls 113b and 113c are opposed to each other and sidewalls 113d and 113e are opposed to each other. Sidewalls 113b-113e extend around the outer periphery of floor 113a so that sidewalls 113b-113e and floor 113a bound an inner volume 141. It is useful to form elevated support structure 113 so that it can contain paint components within inner volume 141. This is desirable in case one or more paint components leak from paint component storage system 130. The paint components can be contained within inner volume 141 in many different ways, such as by lining floor 113a, as well as sidewalls 113b-113e with a liner capable of containing the paint component(s).

In this embodiment, paint component storage system 130 is positioned on floor 113a in inner volume 141. It should be noted that, in some embodiments, mass flow controller system 131 is also positioned on floor 113a in inner volume 141, but it can be positioned outside of inner volume 141. When mass flow controller system 131 is positioned on floor 113a, plumbing system 115 (not shown) generally extends over sidewalls 113b, 113c, 113d, and/or 113e.

In operation, the type of paint desired is determined and this information is inputted into computer system 101 using touch screen 101a and/or keyboard 101b. The type of paint desired can be determined in many different ways, but it is usually determined in response to a consumer desire to purchase it. The information inputted into the computer can be of many different types, but it generally corresponds to the desired paint sheen, quality, coverage attributes, drying time, etc.

The program operated by computer system 101 determines the paint components, as well as their amounts, necessary to make the desired type of paint. In response to the determination of the paint components, computer system 101 operates flow control system 131 so that paint component storage system 130 flows the amount and type of paint components to dispenser 106 through plumbing system 115. The paint components are dispensed by nozzles 118 into paint container 110, as described above, to form a desired paint 121, as shown in FIG. 2b. In this way, nozzles 118 dispense pre-selected paint components in response to an indication from computer system 101. The amount of paint components dispensed can be determined in many different ways, such as by volume and weight. In this embodiment, however, the paint components are dispensed by weight, as determined by paint weight scale 111.

Instead of dispensing the paint components into a paint container 110, the components could be dispensed along with colorant into a mini-sprayer. The mini-sprayer would use a cartridge system. The mini-sprayer cartridges would be filled and pressurized. The mini-sprayer cartridges would attach to a gun or sprayer and would include a pressure release valve that allows all of the pressure to be released before refilling.

As discussed above, desired paint 121 can be provided with a desired color by using color sample 122 and spectrophotometer 102 or by using a color data file. In the situation in which color sample 122 and spectrophotometer 102 are used, color sample 122 is held by sample holder 119 and spectrophotometer 102 flows colorant signal $S_{Colorant}$ to computer system 101 through cable 103. Computer system 101 receives signal $S_{Colorant}$ and determines the amount and color of the colorants needed to drive the color of the paint component combination contained by container 110 to match the color of color sample 122. The amount of paint colorants dispensed can be determined in many different ways, such as by volume and weight. In this embodiment, however, the colorants are dispensed by volume, as determined by colorant mass flow control system 112.

In response to the determination of the colorants, computer system 101 operates colorant mass flow control system 112 so that colorant storage system 104 flows the amount and color of colorants to dispenser 106 through plumbing system 128. The colorants are dispensed by colorant nozzle 127 into paint container 110 so that desired paint 121 is provided with a desired color. In this way, plumbing system 128 allows colorant components to flow between colorant storage system 104 and colorant nozzle 127 in response to an indication from computer system 101.

In the situation in which the color data file is used, the color data file is selected and it provides data to computer system 101 that corresponds to the desired color. Colorant storage system 104 dispenses the colorants so, when combined with the paint components, the combination has a color driven to match the color represented by the color data file. Hence, the paint color indication can be provided to computer system 101 by selecting the color data file that corresponds with the desired color.

FIG. 3a is a perspective view of paint manufacturing system 120 of FIG. 2a with a pumping system 105, in accordance with the invention, and FIG. 3b is a schematic diagram of paint manufacturing system 120. Pumping system 105 is in fluid communication with paint component storage system 130 through hoses. The operation of pumping system 105 is controlled by computer system 101, wherein computer system 101 controls the flow of paint components therethrough. Further, pumping system 105 is positioned below level 140 and paint component storage system 130 is positioned above level 140. In this way, pumping system 105 is useful for flowing paint components upwardly through level 140 and into paint component storage system 130. It should be noted, however, that pumping system 105 can flow paint components downwardly and into paint component storage system 130 if storage system 130 is positioned below paint manufacturing system 100.

In this embodiment, pumping system 105 includes pumps 105a, 105b, 105c, 105d, 105e and 105f in fluid communication with paint component storage containers 130a, 130b, 130c, 130d, 130e and 130f, respectively, through hoses 107a, 107b, 107c, 107d, 107e and 107f, respectively. Pumps 105a-105f can be of many different types, such as air diaphragm pumps. One type of air diaphragm pump that can be used is made by Warren Rupp and referred to as the SANDPIPER. Pumps 105a-105f can also be peristaltic pumps, such as those made by Watson-Marlow Bredel and referred to as the SPX32 peristaltic pump.

Pumping system 105 is in fluid communication with paint component transport containers, embodied as totes 117a, 117b, 117c, 117d, 117e and 117f. In this embodiment, totes 117a, 117b, 117c, 117d, 117e and 117f are in fluid communication with pumps 105a, 105b, 105c, 105d, 105e and 105f, respectively, through hoses 108a, 108b, 108c, 108d, 108e and 108f, respectively. The totes can be of many different types, but they are generally lined containers capable of containing a paint component so that the paint component can be transported from one location to another.

In this embodiment, the totes are positioned below level 140 and paint component storage system 130 is positioned above level 140. In this way, the paint component is flowed from a level below level 140 to a level above it. However, the totes can be positioned above paint component storage system 130 if storage system 130 is positioned below paint manufacturing system 100.

In operation, a paint component transfer container, such as tote 117d, is positioned proximate to pump 105d. Tote 117d can be moved in many different ways, such as with a fork lift 116, as shown in FIG. 3c. Hose 108d is connected between tote 117d and pump 105d so they are in fluid communication with each other. Pump 105d flows the paint components contained by tote 117d from tote 117d, through hoses 108d and 107d, and into paint component container 130d. In this way, paint component container 130d is filled without interrupting the manufacture of paint. The manufacture of paint is not interrupted because paint components can be dispensed by dispenser 106 while paint component storage system 130 is being filled with paint components.

Figure 8:
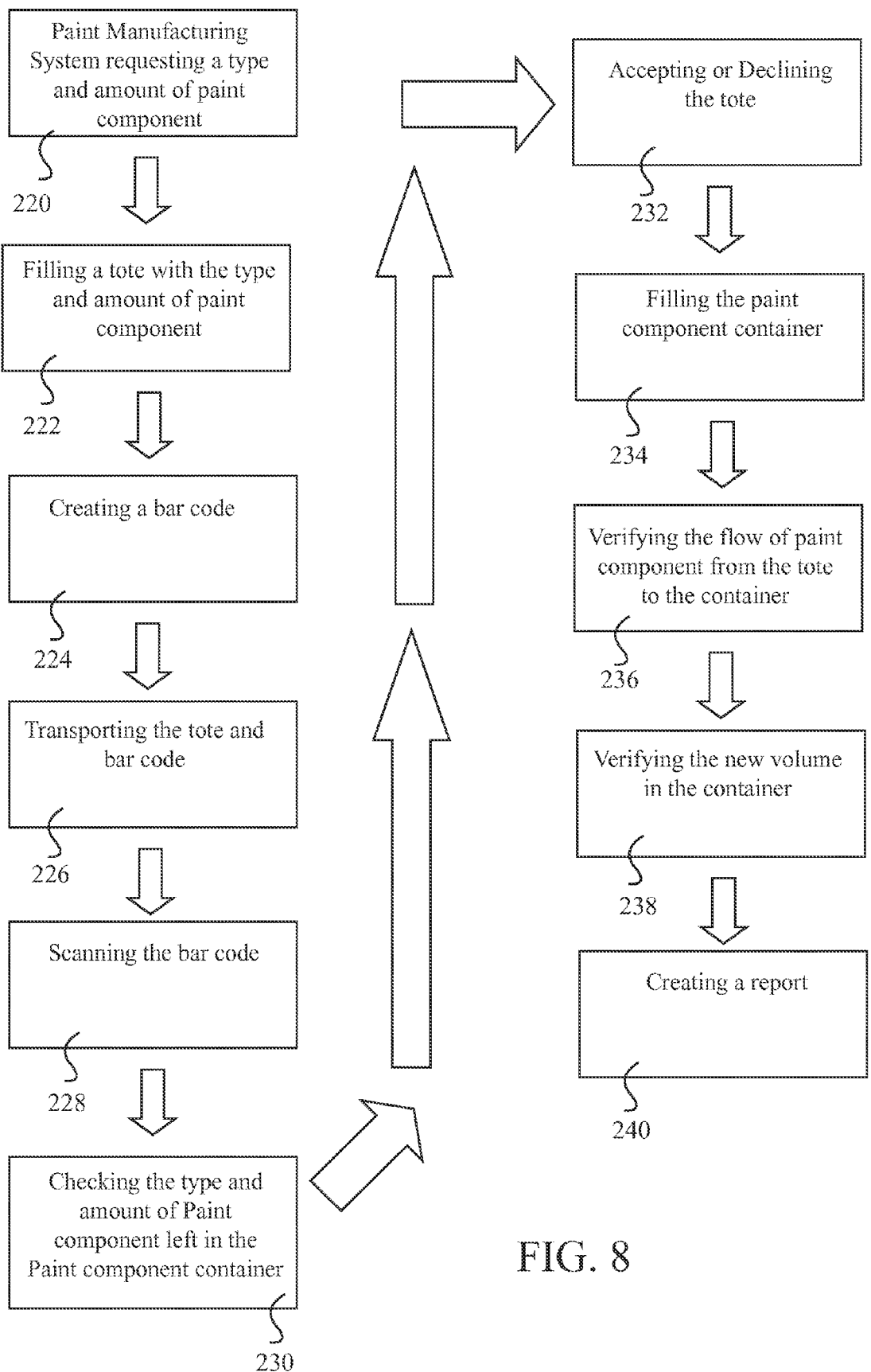
FIG. 8 is a block diagram of a method of refilling a paint component container, in accordance with the invention.

Monitoring the amount of fluid in the paint component containers and making sure they are refilled correctly is very important. A method for refilling a paint component container of a paint manufacturing system as illustrated in FIG. 8 comprises the paint manufacturing system requesting an amount and type of a paint component 220. This request may be done by a machine operator through the paint manufacturing system or else the system may make the order automatically when the paint component is getting low. The system may determine that the paint component is getting low by keeping a running total of the amounts added and subtracted from the paint component container. In other embodiments, a sensor may be coupled to the paint component container. The sensor may be placed in the container and then be able to determine the amount of paint component in the container. The sensor may use ultrasound technology, laser technology or the like.

The next step in this method for refilling the paint component container may comprise filling a tote with the amount and type of paint component requested by the paint manufacturing system 222. This step will typically be completed away from the point of sale at a warehouse or manufacturing facility.

Figure 6:
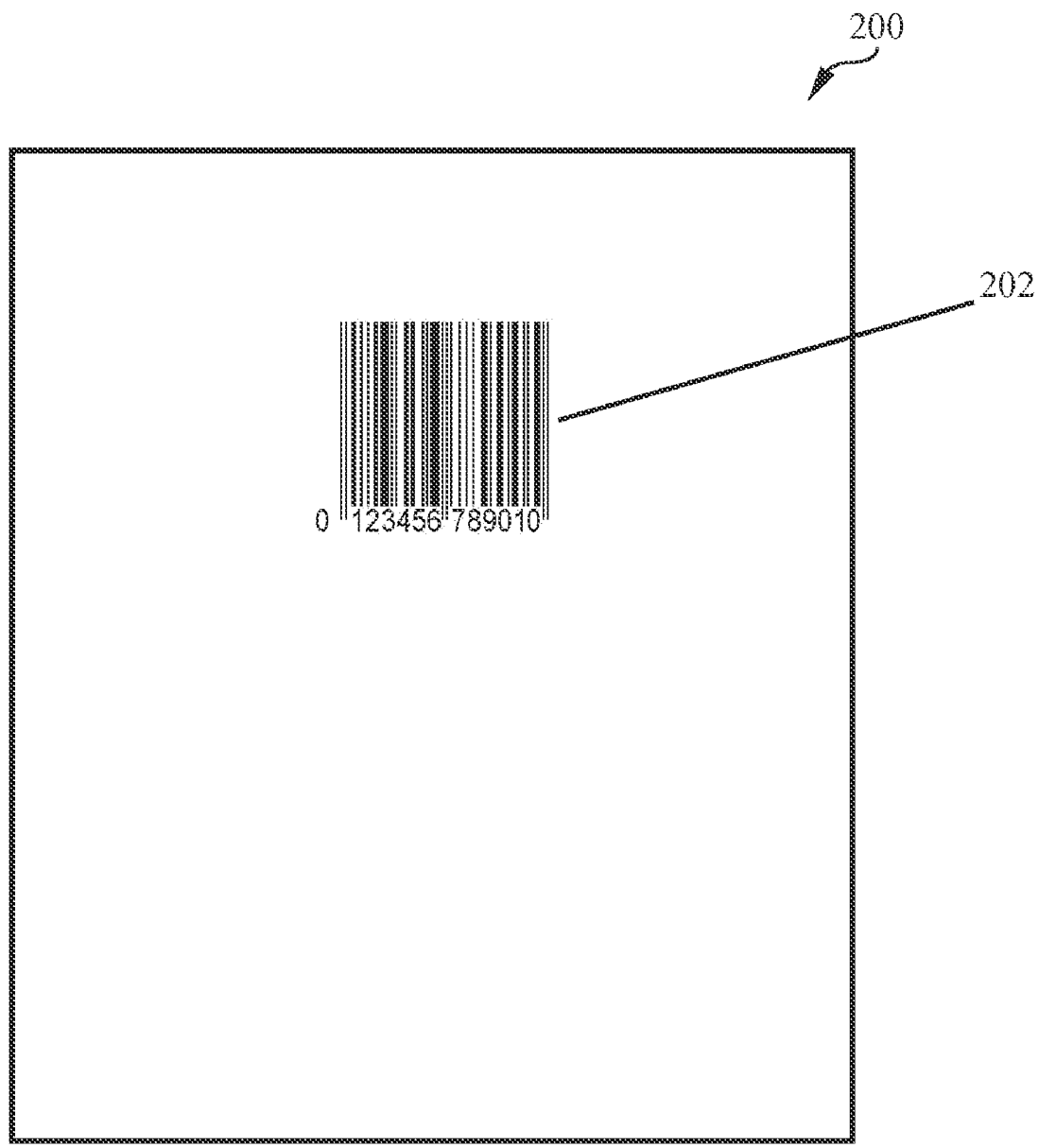
FIG. 6 is a front view of a tote, in accordance with the invention.

Once the tote is filled a bar code is created to indicate the amount and type of paint component 224. This bar code 202 may be placed on the tote 200 as shown in FIG. 6. Placing the bar code 202 on the tote 200 prevents the bar code 202 and tote 200 from getting separated or mixed up. It is also possible, however, that the bar code may simply be placed with the tote. Tracking the levels in totes is also important. Therefore a sensor using ultrasound or laser technology may be used to verify the amounts in the totes. This information may also be used to determine if the tote is leaking.

Next the tote and bar code are transported to the point of sale where the paint manufacturing system is located 226. Then the bar code is scanned 228 to determine the type and amount of paint component contained in the tote. Once this has been completed, the amount of paint component remaining in the paint component container is checked using the sensor described above 230. The type of paint component in the container may also be checked 230.

The tote is now either accepted or declined 232. The tote is accepted if the amount and type of paint component contained in the tote matches the amount and type of paint component needed to refill the paint component container. The tote is declined if the amount and type of paint component needed to refill the paint component container does not match that in the tote.

Once the tote is accepted, the paint component container is filled 234. During the filling process the flow of paint component from the tote to the paint component is verified 236. This may also use the above described sensor.

Once the paint component container is filled, the amount of paint component in the container may be verified using the sensor 238. Then a report may be created detailing the amount of paint component, the type of paint component, the date of refill and the like 240.

FIG. 4a is a block diagram of a method 150 of manufacturing a desired type of paint at a point of sale, in accordance with the invention. In this embodiment, method 150 includes a step 151 of providing at least two paint components and a step 152 of manufacturing a paint by mixing the paint components together at a point of sale. In accordance with the invention, the paint components are selected from a group that includes a pigment composition, a dispersant thickening agent, and a resin content binder. In one particular embodiment, the paint components include a resin content binder, and a pigment composition and/or dispersant thickening agent. In accordance with the invention, the paint components are contained in separate containers before they are mixed together.

FIG. 4b is a block diagram of a method 165 of manufacturing a desired type of paint, in accordance with the invention. In this embodiment, method 165 includes a step 166 of providing a first container that contains a paint component that consists essentially of a resin content binder. Method 165 includes a step 167 of providing at least one other paint component. Method 165 includes a step 168 of manufacturing a paint, at a point of sale, using the paint components. In accordance with the invention, the paint is manufactured in a second container, such as paint container 110.

FIG. 4c is a block diagram of a method 170 of manufacturing a desired type of paint, in accordance with the invention. In this embodiment, method 170 includes a step 171 of providing a first container that contains a material consisting essentially of a first paint component. Method 170 includes a step 172 of providing a second container that contains a material consisting essentially of a second paint component. Method 170 includes a step 173 of flowing predetermined amounts, at a point of sale, of the first and second paint components into a paint container, such as paint container 110.

FIG. 4d is a block diagram of a method 175 of manufacturing a desired type of paint, in accordance with the invention. Method 175 includes a step 176 of providing a first paint component and a step 177 of providing a second paint component. The first and second paint components in steps 176 and 177 are generally provided in predetermined amounts. Method 175 includes a step 178 of manufacturing, at a point of sale, the paint which includes the first and second paint components. The paint is generally manufactured by combining the first and second paint components. The first and second paint components can be combined in many different ways, such as by mixing in a paint container, such as paint container 110.

FIG. 5a is a block diagram of a method 180 of manufacturing a desired type of paint at a point of sale, and providing it with a desired color, in accordance with the invention. In this embodiment, method 180 includes a step 181 of flowing a colorant signal from a spectrophotometer to a computer system. The colorant signal corresponds to an indication of a desired color. The indication of the desired color can be provided in many different ways, such a color sample. Method 180 includes a step 182 of dispensing two or more paint components into a paint container. The type and amount of paint components dispensed is determined in response to an indication of a desired type of paint. Method 180 includes a step 183 of dispensing one or more colorants into the paint container to drive the color of the paint components to the desired color.

FIG. 5b is a block diagram of a method 184 of manufacturing a desired type of paint at a point of sale, and providing it with a desired color, in accordance with the invention. In this embodiment, method 184 includes a step 185 of choosing the desired type of paint. Method 184 includes a step 186 of determining the type and amount of paint components that the desired type of paint includes. Method 184 includes a step 187 of dispensing the type and amount of paint components determined in step 186 to produce the desired type of paint. Method 184 includes a step 188 of flowing a colorant signal to the computer system, the colorant signal corresponding to the desired color. Method 184 includes a step 189 of dispensing one or more colorants to drive the color of the paint to the desired color.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. In a paint manufacturing system for manufacturing paint at a point of sale, a computer-implemented method for adding a component to a paint component container of the paint manufacturing system comprising the steps of:
    providing a plurality of the paint component containers, wherein each of the paint component containers contains a volume of paint component and wherein an amount and type of paint component needed to refill a paint component container is requested for at least one of the plurality of paint component containers, the amount of paint determined by a volume sensor coupled to the paint component container;
    generating a bar code that corresponds to the amount and type of paint component requested to be added to the paint component container;
    filling a tote with the amount and type of the paint component requested, placing the bar code on the filled tote, and transporting the tote to the paint component container;
    scanning the bar code to verify that the amount and type of paint component in the tote matches with the amount and type of paint component requested for the paint component container; and
    initiating pumping of the paint component from the tote to the paint component container upon verifying the bar code information matches the amount and type of paint component requested.

2. The method of claim 1 wherein the generating step takes place before the requesting step.

3. The method of claim 1 further comprising:
    maintaining bar code information within the system; and
    comparing the tote bar code to the maintained bar code information for verification purposes.

4. The method of claim 1, wherein the sensor is an ultrasound sensor coupled to the paint component container.

5. The method of claim 1, wherein the sensor is a laser sensor.

6. The method of claim 1, further comprising creating a report of the volume in the paint component container after filling.

7. The method of claim 1, wherein the paint manufacturing system automatically requests the amount and type of paint component needed to refill the paint component container when the amount of paint component in the paint component container reaches a predetermined level.

\* \* \* \* \*